US007965357B2

(12) United States Patent
Van De Witte et al.

(10) Patent No.: US 7,965,357 B2
(45) Date of Patent: Jun. 21, 2011

(54) TRANSFLECTIVE LCD DISPLAY DEVICE COMPRISING A PATTERNED POLARIZER, DISPLAY HAVING THE SAME, AND METHOD HAVING THE SAME

(75) Inventors: Peter Van De Witte, New Territories (CN); Rifat Ata Mustafa Hikmet, Eindhoven (NL)

(73) Assignee: Chimei Innolux Corporation, Miao-Li County (TW)

( * ) Notice: Subject to any disclaimer, the term of this patent is extended or adjusted under 35 U.S.C. 154(b) by 949 days.

(21) Appl. No.: 10/599,856

(22) PCT Filed: Apr. 8, 2005

(86) PCT No.: PCT/IB2005/051154
§ 371 (c)(1),
(2), (4) Date: Jul. 31, 2007

(87) PCT Pub. No.: WO2005/101106
PCT Pub. Date: Oct. 27, 2005

(65) Prior Publication Data
US 2008/0002106 A1    Jan. 3, 2008

(30) Foreign Application Priority Data
Apr. 15, 2004    (EP) .................................. 04101550

(51) Int. Cl.
*G02F 1/1335* (2006.01)

(52) U.S. Cl. ......................................... 349/114; 349/96

(58) Field of Classification Search .......... 349/113–114, 349/15, 96; 359/489
See application file for complete search history.

(56) References Cited

U.S. PATENT DOCUMENTS

| 7,023,509 | B2 | 4/2006 | Iijima et al. ................... 349/113 |
| 7,355,662 | B2 | 4/2008 | Tsujimura et al. ............. 349/96 |
| 7,738,056 | B2 | 6/2010 | Tsujimura et al. ............. 349/96 |
| 2001/0017679 | A1* | 8/2001 | Ha et al. ........................ 349/113 |
| 2003/0210369 | A1 | 11/2003 | Wu |
| 2004/0027510 | A1* | 2/2004 | Iijima et al. .................... 349/61 |

FOREIGN PATENT DOCUMENTS

| JP | 4-75025 | 3/1992 |
| JP | 2001-201767 | 7/2001 |
| JP | 2001-222009 | 8/2001 |
| JP | 2003-302628 | 10/2003 |
| WO | WO93/25992 | 12/1993 |

OTHER PUBLICATIONS

Japanese office action with translation dated Jan. 18, 2011.

* cited by examiner

*Primary Examiner* — Mark A Robinson
*Assistant Examiner* — Charles Chang
(74) *Attorney, Agent, or Firm* — Fish & Richardson P.C.

(57) ABSTRACT

The invention relates to a transflective LCD incorporating a partial mirror (224) as the transflector. In the transmissive display mode, light from a backlight system (240) passes apertures (226) in the transflector (224). According to the invention, recycling of light to the backlight system (240) is improved by substantially only polarizing light that passes an aperture. This is achieved by means of a patterned polarizer (222) extending over the apertures in the partial mirror.

20 Claims, 2 Drawing Sheets

TRANSFLECTIVE LCD DISPLAY DEVICE COMPRISING A PATTERNED POLARIZER, DISPLAY HAVING THE SAME, AND METHOD HAVING THE SAME

The invention relates to a transflective liquid crystal display (LCD) device.

Liquid Crystal Displays (LCDs) are increasingly used in computer monitors, television sets, handheld devices et cetera. For mobile applications, LCDs have become the standard display device due to low power consumption, reliability and low price.

The operation of LCDs is based on light modulation in an active layer of a liquid crystalline (LC) material. By changing an electric field, the light modulation of the active layer is altered, and characteristics of the light passing through the LC layer are modified. Generally the active layer modifies a state of polarization of the passing light.

The display cell is conventionally sandwiched between two substrates, a front substrate con the viewer side and a rear substrate on the backlight side. Optical elements such as polarizers are attached to the outer surfaces of said substrates or are alternatively provided within the display cell.

LCDs are generally operable in one or both of two modes, namely a transmissive mode and a reflective mode. In a transmissive LCD, the active layer modulates light originating from a backlight system which is usually arranged adjacent to the rear substrate. Transmissive LCDs generally have a good contrast ratio, however when used in an outside environment the display becomes practically unreadable.

The active layer in a reflective LCD modulates ambient light that impinges on the display. The reflective LCD relies on a reflector for reflecting the modulated ambient light back towards the viewer. Thus, in the reflective mode, ambient light generally passes through the active layer twice. The reflector is usually provided in the form of a mirror adjacent or on the rear substrate. However, a reflective LCD is difficult to read if ambient lighting is insufficient.

Therefore, mobile devices may incorporate a so-called transflective LCD, which operates in the transmissive and reflective modes at the same time. This has the advantage that the display is usable both under bright and dim ambient light conditions. In the latter case, light from the backlight system is used for viewing the display.

A common type of transflective LCD incorporates a reflector based on a partial mirror. The partial mirror is arranged for reflecting ambient light while at the same time passing light originating from the backlight system. In designing the partial mirror, generally a trade-off has to be made between sufficient performance of the display in the reflective and transmissive modes. A commonly used type of partial mirror is based on a reflective layer provided with apertures for passing light from the backlight system.

Because of the relatively small aperture dimensions, the light efficiency of the conventional transflective LCD in the transmissive mode is inherently rather poor. Generally, in order to have sufficient display performance in the transmissive mode, a backlight with a relatively high emission intensity is required. This is however undesirable in a mobile device because of the inherent high power consumption and shortened lifetime of such a bright backlight.

It is an object of the invention to provide an improved transflective LCD device having increased backlight efficiency.

This object is achieved by means of the transflective LCD device according to the invention as specified in independent Claim 1. Further advantageous embodiments are set out in the dependent Claims.

According to the invention, a patterned polarizer is arranged between the active layer and the backlight system of the transflective LCD device, said patterned polarizer extending substantially over an area of said apertures in said partial mirror.

A known LCD has a linearly polarizing foil arranged at the backlight side of the display, which foil is usually provided on the exterior side of the rear substrate. Apart from reflecting ambient light in the display cell, the partial mirror also reflects part of the light emitted by the backlight system, so that backlight that does not pass through an aperture is recycled and re-enters into a light guide of the backlight system.

However, the inventors recognized that in prior art devices this recycling is particularly ineffective, due to the fact that light being recycled passes the linear polarizer at the backlight side twice. A relatively large fraction of the recycled light is being absorbed in the polarizer and consequently lost.

The patterned polarizer of the invention extends substantially over an area of said apertures in said partial mirror, and leaves a reflecting portion of said partial mirror free. In this case, backlight recycling by the partial mirror is more effective as a fraction that is lost in the polarizing foil is reduced. A larger part can thus be recycled and re-used, so that the backlight system can emit light at lower intensity, while maintaining the same brightness of the LCD device in the transmissive mode. Alternatively, the backlight system can emit light at the same intensity, and the brightness of the LCD device in the transmissive mode is increased.

For the greatest beneficial effect, it is preferred that the patterned polarizer is confined within the aperture area, and the reflective portions of the partial mirror are substantially free of polarizing material.

The patterned polarizer may be a linear polarizer only, or may also include a quarterwave retarder so as to form a circular polarizer. The quarterwave retarder may be provided as a foil, or alternatively be provided in patterned form as well. It is also possible that the patterned polarizer is a reflective polarizer, such as a cholesteric linear or circular polarizer. However as they reflect light their use alone can have undesired contrast reduction in the reflective mode.

These and other aspects of the invention will now be elucidated further with reference to the accompanying drawings. Herein:

In the drawings, like reference numerals represent like elements.

The Figures display the optical configuration of the device only, additional elements such as color filters, front and rear substrate and pixel electrodes are generally provided in the LCD device, but not shown for clarity reasons.

Figure 1:
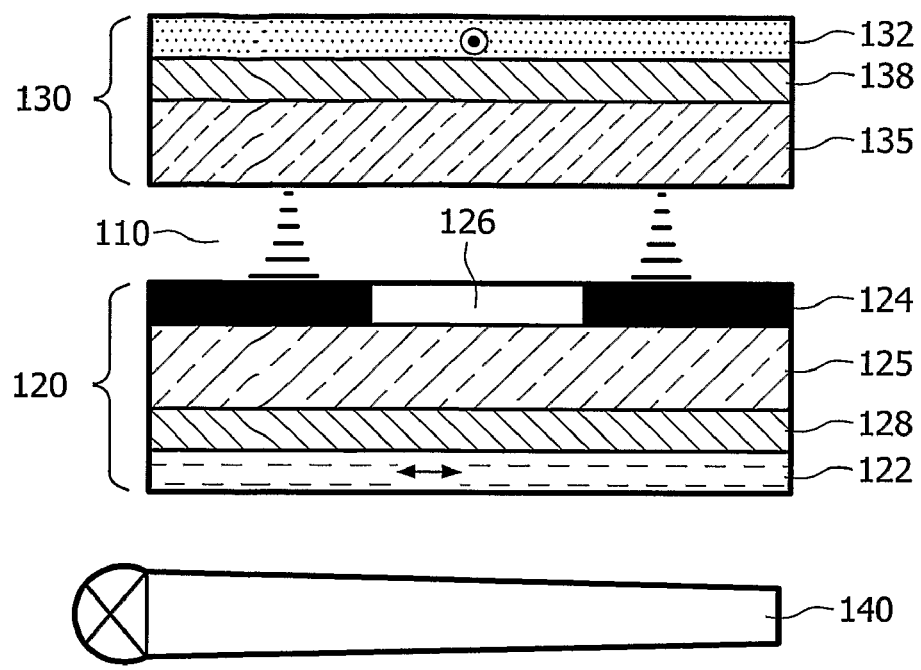
FIG. 1 shows a transflective LCD device according to the prior art.

The optical configuration of a single picture element 100 of a known transflective LCD is shown in FIG. 1. The operation of the transflective LCD device is based on light modulation in the active layer 110 including a liquid crystalline material.

The active layer 110 is arranged between a front stack 130 of optical elements on a viewer side of the LCD, and a rear stack 120 of optical elements on the opposing side of the LCD. A backlight system 140 is arranged behind the rear stack 120 for emitting light for operating the device in the transmissive mode.

In a known transflective LCD, the front stack 130 usually includes an absorbing linear polarizer 132 and a retarder 138, arranged on the outside of a front substrate 135. The rear stack 120 also includes an absorbing linear polarizer 122 arranged on the outside of rear substrate 125, and thus facing the backlight system 140.

The rear polarizer 122 has its polarization direction arranged perpendicularly to the polarization direction of the front polarizer 132. Thus, the active layer 110 is arranged between crossed linear polarizers. The total retardation of the retarder 138 plus the retardation of the liquid crystal material in the active layer 110 is set to be either zero or half lambda ($\lambda/2$).

The rear stack 120 further includes a partial mirror 124 on the inside of substrate 125, that is the partial mirror 124 faces the active layer 110. The partial mirror is also referred to as 'transflector' hereinafter. The rear stack 120 further optionally includes the quarter wave retarder layer indicated by 128.

The partial mirror 124 is a reflective layer on substrate 125, provided with apertures 126 through which light emitted by the backlight system 140 can pass into the active layer 110. Thus, the backlighting required for LCD operation in the transmissive mode is provided through the apertures 126 in the transflector 124.

The apertures 126 typically only comprise about 20 to 30 per cent of the total surface area of the transflector 124, the remainder of the surface area being reflective. Thus, only a relatively small portion of light emitted by the backlight system 140 passes through the apertures 126, and the transflector 124 reflects the remaining part back towards the backlight system. Such light re-enters into the light guide 142 of the backlight system 140, and can exit therefrom again at a different location, thereby contributing to the backlighting of another pixel in the transmissive mode. This process is called backlight recycling. In order to further improve the efficiency of backlight recycling, a so called polarizing reflector is often placed on top of the back light 140. However, as the absorbing linear polarizer 122 is arranged between the transflector 124 and the backlight system 140, backlight recycling in conventional LCDs is not very efficient. The recycled light passes the absorbing polarizer 122 twice, and therefore a substantial portion of recycled light is lost due to absorption. This is the case for both a rear stack without quarter wave retarder, and a rear stack with the quarter wave retarder 128. The effect is strengthened by the fact that the recycled light becomes depolarized again upon re-entering the backlight system 140, so that when recycled light is re-emitted towards another pixel, it has to pass absorbing polarizer 122 again.

Figure 2:
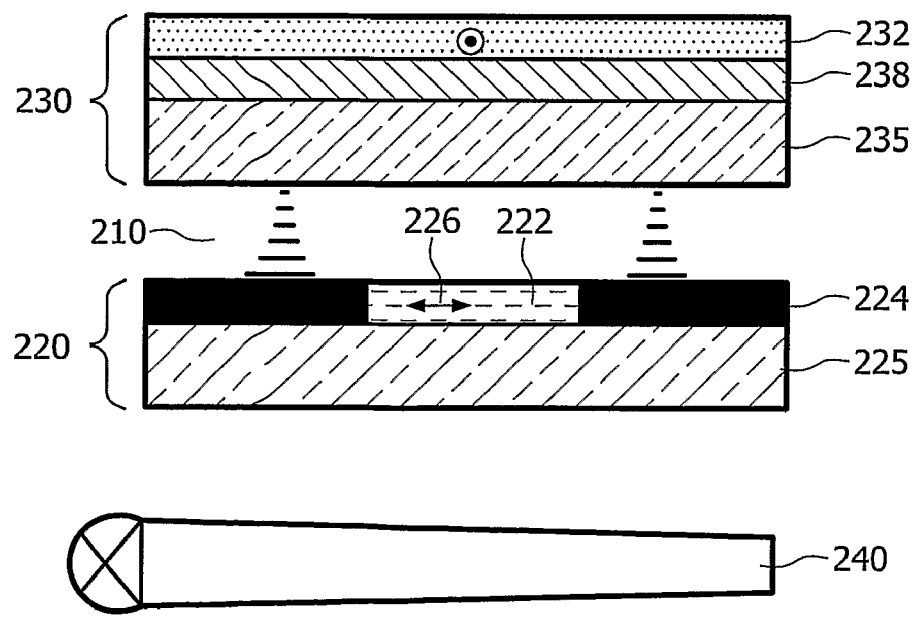
FIG. 2 shows a first embodiment of a transflective LCD device according to the invention.

An embodiment of the transflective LCD according to the invention is shown in FIG. 2. This transflective LCD has an improved rear stack 220 for more efficient backlight recycling, so that a larger amount of light emitted by the backlight system 240 can be used in transmissive mode operation of the LCD.

Instead of an absorbing linear polarizer extending over the entire display surface area, a patterned absorbing linear polarizer 222 is provided substantially only at the location of the apertures 226 in the partial mirror 224.

Therefore, essentially only light that passes the apertures 226 is being polarized by the linear polarizer 222. The reflective parts of the partial mirror 224 reflect the remaining light back towards the backlight system 240, and since this reflected light no longer has to pass any absorbing optical elements, it is substantially recycled to the backlight system 240 in its entirety.

Thus, the amount of recycled light is increased as compared to conventional transflective LCDs. As a result, the transmissive mode of the LCD can display higher brightness images without the need to increase the power of the backlight system 240, or alternatively the transmissive mode of the LCD can display images at the same brightness level while the power of the backlight system 240 can be reduced.

Figure 3:
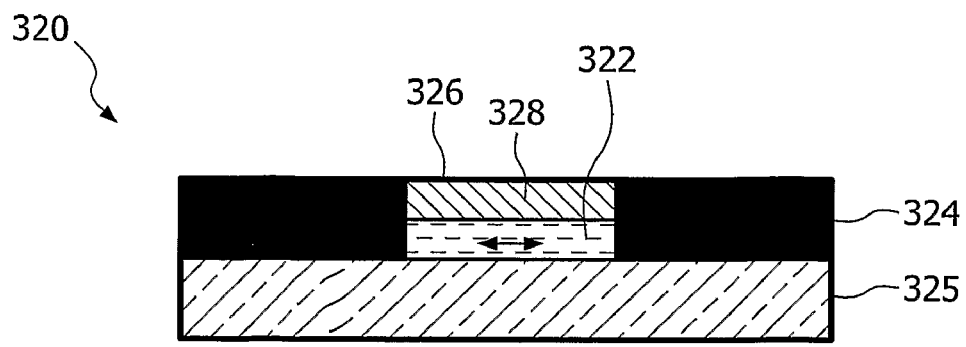
FIG. 3 shows a second embodiment of a transflective LCD device according to the invention.

A further preferred embodiment of the invention incorporates the rear stack 320 shown in FIG. 3. This rear stack 320 incorporates a quarter wave retarder 328 on the backlight side, which extends substantially only within the apertures 326 in the partial mirror 324. This embodiment also has a quarter wave retarder foil 336 in the front stack on the viewer side of the active layer 310, which improves display performance especially for the reflective mode.

Only light passing an aperture 326 becomes circularly polarized by the combination of the patterned linear polarizer 322 and quarter wave retarder 328, thus circularly polarized light enters the active layer while recycled light remains substantially unpolarized and re-enters the light guide of the backlight system 340 without significant absorption losses. Efficient light recycling can be achieved below the partial mirror 324, and for the transmissive mode operation of the transflective LCD circularly polarized light is provided.

In further embodiments, a patterned cholesteric polarizer can be included for providing circularly polarized light, to replace the combination of patterned linear polarizer and quarter wave retarder.

A patterned polarizer on the partial mirror can for example be manufactured from conventional UV polymerizable liquid crystalline materials which can be coated on the partial mirror. A patterned layer can be obtained from such a material by using the partial mirror itself as a mask in an UV radiation step. Only UV light passing through the apertures in the partial mirror radiates on the material, and therefore material provided directly inside or over the apertures is cross-linked and polymerized. In a subsequent developing step, remaining liquid material is removed and a patterned layer of polymerized and cross-linked material remains.

For example, a liquid material including a polymerizable liquid crystalline acrylate and a dichroic dye can be spin-coated on one side of the partial mirror. Then, the partial mirror is radiated from the opposite side with UV light. After developing, only the cross-linked and polymerized material remains. Due to the presence of the dichroic dye molecules, the cross-linked and polymerized material linearly polarizes light passing through it. Thus, a patterned linear polarizer is obtained, which only extends over the apertures of the partial mirror.

If a patterned retarder, in particular a patterned retarder, is to be provided as well as shown in FIG. 3, first the patterned polarizer is to be manufacturer, and subsequently an alignment layer needs to be used on top of the patterned polarizer. On top of the alignment layer a polymerizable LC acrylate with a thickness matching the desired retardation, thus in this example a thickness of a quarter of the wavelength of visible light, is provided. A similar radiation step as for the patterned linear polarizer is subsequently carried out.

Alternatively to the configuration shown in FIG. 3, a continuous quarter wave retarder layer is provided on the substrate carrying the partial mirror. The retarder must be provided underneath the partial mirror.

Figure 4:
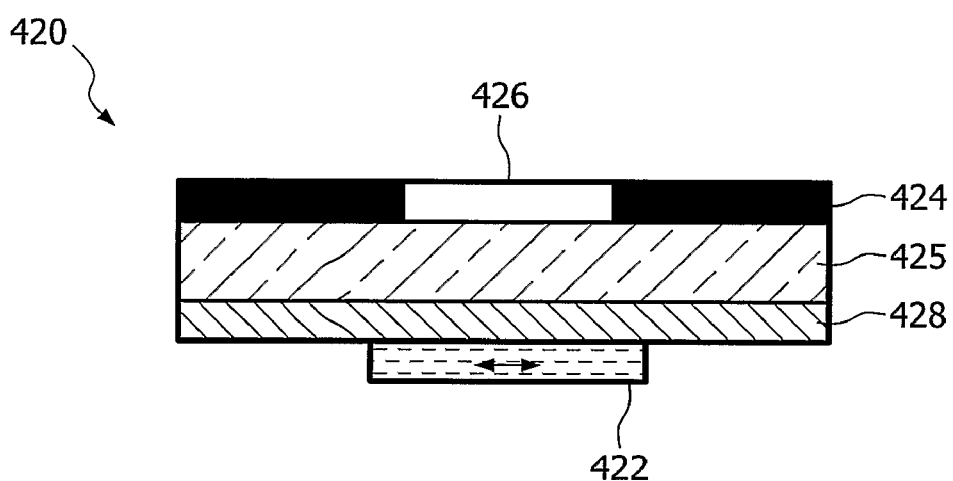
FIG. 4 shows a fourth embodiment of a transflective LCD device according to the invention.

In a further embodiment of the rear stack 420 as shown in FIG. 4, the patterned polarizer 422 and a quarter wave retarder foil 428 are placed on the outside of substrate 425 instead of on the side facing the active layer. The polarizer 422 is patterned in accordance with the apertures 426 in the partial mirror 424, so as to extend at least over an area covered by these apertures 426. Preferably, the patterned polarizer 422 covers a slightly larger area than the apertures. The quarter wave foil 428 could alternatively be replaced by a patterned quarter wave retarder inside the apertures 426 of the partial mirror 424.

Figure 5:
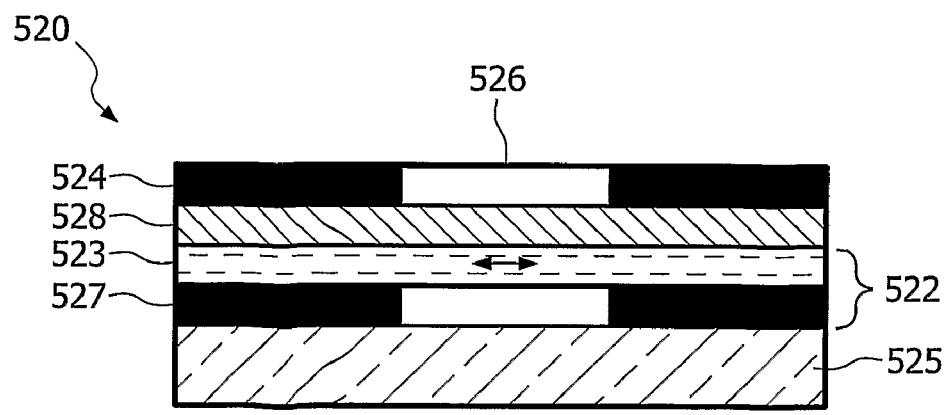
FIG. 5 shows a fifth embodiment of a transflective LCD device according to the invention.

In a further embodiment of the rear stack 520 as shown in FIG. 5, the patterned polarizer 522 is formed as a continuous polarizing foil 523 on the outside of the substrate 525, on which a pattern is defined by means of a further partial mirror 527 between the foil and the backlight system. Only light passing the apertures of the further partial mirror 527 is polarized by the polarizing foil 523, the remainder of the light being recycled to the backlight system.

In FIG. 5, both a polarizing foil 523 and a quarter wave plate 528 are placed between the two partial mirrors 524 and 527. The apertures in the partial mirrors are aligned with respect to each other. The apertures could have the same size for both partial mirrors 524 and 527, or alternatively the apertures in the further partial mirror 527 could be slightly larger than the apertures in partial mirror 524.

As a further preferred embodiment, it is also possible to provide a reflective patterned polarizer in the apertures of the partial mirror, for example a patterned wire-grid polarizer can be integrated with the partial mirror. This could increase efficiency of backlight recycling even further, because now light having the wrong linear polarization direction is not absorbed by the polarizer, but rather reflected therefrom. This light further contributes to backlight recycling. However, this embodiment involves more complicated manufacturing, which could outweigh the further increase in backlight.

In order to improve light recycling efficiency even further patterned reflective polarizers can be combined with the absorbing patterned polarizers. In that case the patterned reflective polariser needs to be positioned between the absorbing polarizer and the backlight system.

In summary, the invention relates to a transflective LCD incorporating a partial mirror as the transflector. In the transmissive display mode, light from a backlight system passes apertures in the transflector. According to the invention, recycling of light to the backlight system is improved by substantially only polarizing light that passes an aperture. This is achieved by means of a patterned polarizer extending over the apertures in the partial mirror.

The invention claimed is:

1. A transflective liquid crystal display (LCD) device, comprising:
   a liquid crystal display cell including an active layer;
   a backlight system to provide backlight to the display cell;
   a partial mirror for reflecting ambient light, provided with apertures for passing light originating from the backlight system; and
   polarizing means comprising a patterned polarizer between the active layer and the backlight system, said patterned polarizer extending substantially over an area of said apertures in said partial mirror, the patterned polarizer being patterned to expose a portion of the partial mirror.

2. The transflective LCD device of claim 1, wherein the patterned polarizer is essentially confined within the area of the apertures of the partial mirror.

3. The transflective LCD device of claim 1, wherein the patterned polarizer comprises a polarizing foil and a further partial mirror having its apertures aligned with the apertures in the partial mirror, the polarizing foil being essentially sandwiched between the two partial mirrors.

4. The transflective LCD device of claim 1, wherein the patterned polarizer is a linear polarizer.

5. The transflective LCD device of claim 3, wherein the polarizing means further includes a quarterwave retarder between the active layer and the backlight system.

6. The transflective LCD device of claim 1, wherein the partial mirror is arranged for recycling light to the backlight system.

7. The transflective LCD device of claim 1, wherein the polarizing means includes a reflective polarizer.

8. The transflective LCD device of claim 2 in which the polarizing means comprises an absorbing patterned polarizer and a reflective patterned polarizer.

9. The transflective LCD device of claim 2 in which the patterned polarizer does not substantially extend outside of the area of the apertures of the partial mirror.

10. The transflective LCD device of claim 2 in which the patterned polarizer is disposed between the partial mirror and the backlight system, and the pattern of the polarizer is configured to polarize a first portion of backlight from the backlight system that passes the apertures in the partial mirror and to allow a second portion of the backlight to be reflected by the partial mirror without being polarized by the polarizer.

11. The transflective LCD device of claim 2, comprising a quarterwave retarder that is also essentially confined within the area of the apertures of the partial mirror.

12. The transflective LCD device of claim 7 in which the reflective polarizer comprises a wire-grid polarizer.

13. A display comprising:
   a liquid crystal layer;
   an at least partially reflective layer to reflect ambient light, the at least partially reflective layer disposed between the liquid crystal layer and a backlight module, the partially reflective layer having apertures to pass backlight from the backlight module to the liquid crystal layer; and
   a patterned polarizer disposed between the liquid crystal layer and the backlight module, the patterned polarizer extending substantially over an area of the apertures in the partially reflective layer, the patterned polarizer being patterned to expose a portion of the partially reflective layer.

14. The display of claim 13 in which the patterned polarizer is substantially confined within the area of the apertures of the at least partially reflective layer.

15. The display of claim 14, comprising a quarterwave retarder also substantially confined within the area of the apertures of the at least partially reflective layer.

16. The display of claim 13 in which the patterned polarizer is disposed between the partially reflective layer and the backlight module, and the pattern of the polarizer is configured to polarize a first portion of backlight from the backlight module that passes the apertures in the partially reflective layer and to allow a second portion of the backlight to be reflected by the partially reflective layer without being polarized by the polarizer.

17. The display of claim 13 in which the polarizer comprises a reflective polarizer.

18. A method of operating a liquid crystal display, the method comprising:
   providing backlight from a backlight module;

passing a first portion of the backlight through apertures in an at least partially reflective layer positioned between the backlight module and a liquid crystal layer;

passing the first portion of the backlight through a patterned polarizer that extends substantially over the apertures, the patterned polarizer being patterned to expose the partially reflective layer; and transmitting a second portion of the backlight from the backlight module to the partially reflective layer, and reflecting the second portion of the backlight by using the exposed portion of the partially reflective layer without passing the second portion of the backlight through the patterned polarizer.

19. The method of claim 18 in which the patterned polarizer has an area that is substantially equal to an area of the apertures of the partially reflective layer.

20. The method of claim 18 in which the patterned polarizer is disposed between the partially reflective layer and the backlight module, the patterned polarizer having openings that expose the partially reflective layer to allow the second portion of the backlight to be reflected by the partially reflective layer without being polarized by the polarizer.

* * * * *